M. C. MERRIMAN.
CUSHION TIRE.
APPLICATION FILED MAY 18, 1911.

1,014,318.

Patented Jan. 9, 1912.

Witnesses
M. Decker.
E. B. Watts.

Inventor
Myron C. Merriman
By Delbert H. Decker
Attorney

UNITED STATES PATENT OFFICE.

MYRON C. MERRIMAN, OF DETROIT, MICHIGAN.

CUSHION-TIRE.

1,014,318. Specification of Letters Patent. Patented Jan. 9, 1912.

Application filed May 18, 1911. Serial No. 628,076.

*To all whom it may concern:*

Be it known that I, MYRON C. MERRIMAN, a citizen of the United States, residing at Detroit, in the county of Wayne and State of Michigan, have invented certain new and useful Improvements in Cushion-Tires, of which the following is a specification.

This invention relates to vehicle tires and particularly to that class known as cushion tires.

The chief object of the invention is to produce a cushion tire which may be readily applied to the modern wheels of auto-vehicles, and which will hold its place when applied and give a degree of resiliency far excelling that of solid rubber tires and closely approximating that of pneumatic tires.

The invention therefore consists in the structure of parts and in their combination for the specified purpose substantially as hereinafter set forth and claimed.

Figure 1:
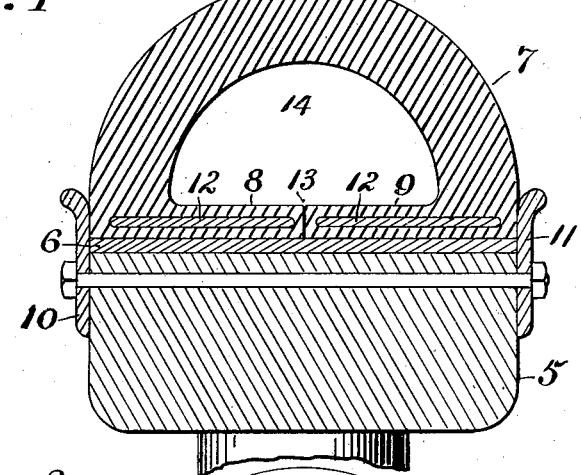
Figure 2:
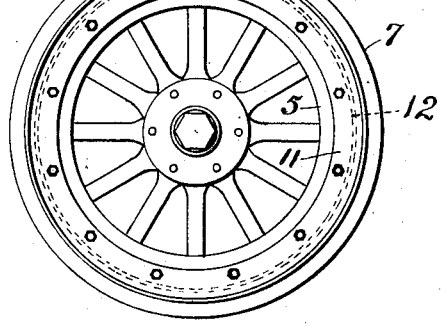
Figure 3:
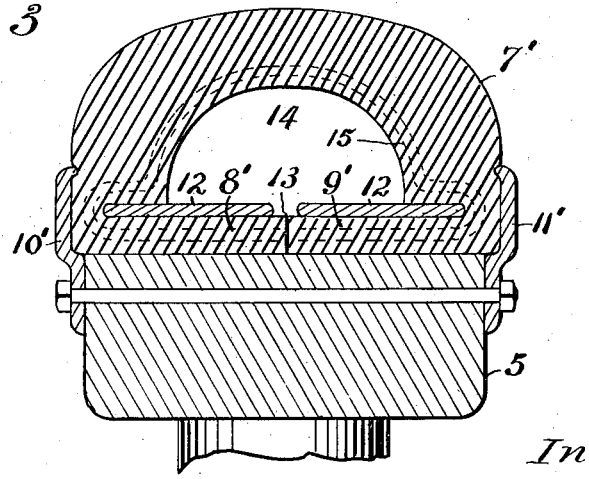

The accompanying drawing which forms a part of this specification represents in Figure 1 a transverse section of one form of the improved tire and adjacent parts of a wheel; in Fig. 2, on a smaller scale, a side elevation of a wheel equipped with a tire formed as in Fig. 1; and in Fig. 3 a transverse sectional view showing a modification of the improved tire.

Up to the date of this invention there has been no practical cushion tire produced. When made with a cavity of sufficient size to provide a useful amount of resiliency they have been so liable to displacement as to render them uncertain and dangerous. When cylindrical in form, it has been impossible to make them continuous and yet provide for readily applying them to a wheel and holding them rigidly in place. And a spliced tire with turnbuckle connection is impractical, since it is bound to go to pieces at the splice. This is also true of any form of spliced tire and of tires having spliced internal retaining rods or wires. Arched cushion tires, as heretofore designed, are still more difficult to retain in place, since a vehicle on skidding would either cause one edge of the tire to roll under or the other edge to roll out, to the end that the tire would be stripped from the wheel. The tire of the present invention is an arched tire and yet overcomes all these objections. It also has greater resiliency than arched tires heretofore designed since, because of the formation of the base of the arch, it is possible to give to the tire a larger cavity without weakening its firm hold upon the wheel.

In Fig. 1 of the drawing, 5 indicates the felly of a wheel, 6 a metallic tire or rim and 7 the arch of the tire, whose base is shown consisting of two parts 8 and 9 integral with the ends of the arch. Side plates as 10 and 11 are bolted to the felly and project beyond the rim to confine the tire upon the wheel. Each portion of the base of the tire is provided with an endless band 12 (Fig. 2, dotted lines) of steel or any other suitable material. These rigid bands 12 are preferably molded in the base portions and are of sufficient width to prevent any appreciable lateral movement of the portions of the base when the tire is applied to the wheel and the side plates are in place. The portions 8 and 9 of the base are disjoined as at 13. This facilitates the manufacture of the tire, since from the cavity 14 the core may be readily removed by separating the portions of the base.

In Fig. 3 a heavier tire is shown at 7' and the steel bands 12 are shown as only partially embedded in the portions 8' and 9' of the base. The portions of the base, however, abut at the line 13 as in Fig. 1 and tightly fill the space between the side plates 10' and 11'. Thus the base portions form a chord to the arch of the tire.

The tires are made as usual of rubber and may be suitably reinforced by canvas or other fabric as typified by the dotted lines at 15 in Fig. 3. The side plates may be of any suitable shape. They may have their outer edges outturned as in Fig. 1 to protect the tire and shield the bolt-heads and nuts, or the outer edges thereof may be turned in as in Fig. 3, while the inner half of the plates may be inset, whereby the outer halves shield the bolt-heads and nuts.

The cushion tire in either of the forms above described is applied to a wheel by sliding it laterally onto the rim or felly and then bolting the side plates in place. To remove a tire it is necessary only to take off the nuts by which plate 11 or 11' is held to the felly, when by removing said plate the tire may be slid laterally from the wheel.

With the arched cushion tires described it is impossible to roll either foot of the arch out of its seat or to dislodge it in any way so long as its respective endless band is intact and the side plates are in place, and the large continuous cavity under the arch insures ample resiliency.

The invention claimed is:—

The combination with a wheel the rim whereof is provided with side plates one of which is removable, of an endless cushion tire consisting of a resilient arch having inwardly projecting base portions integral with the feet of the arch and abutting to form a chord to the arch, and two rigid endless bands, one forming a part of each base portion whereby the chord maintains the feet of the arch firmly upon the rim and against the said side plates thereby giving full force and effect to the cushioning function of the arch regardless of the thrust of the wheel and without any possibility of displacement of the tire.

In testimony whereof I have affixed my signature in presence of two witnesses.

MYRON C. MERRIMAN.

Witnesses:
 FERN SHAFER,
 L. F. WARD.